Aug. 15, 1967  D. J. MARSHALL  3,335,611
INDUSTRIAL WHEEL BALANCING DEVICE
Filed April 9, 1965  3 Sheets-Sheet 1
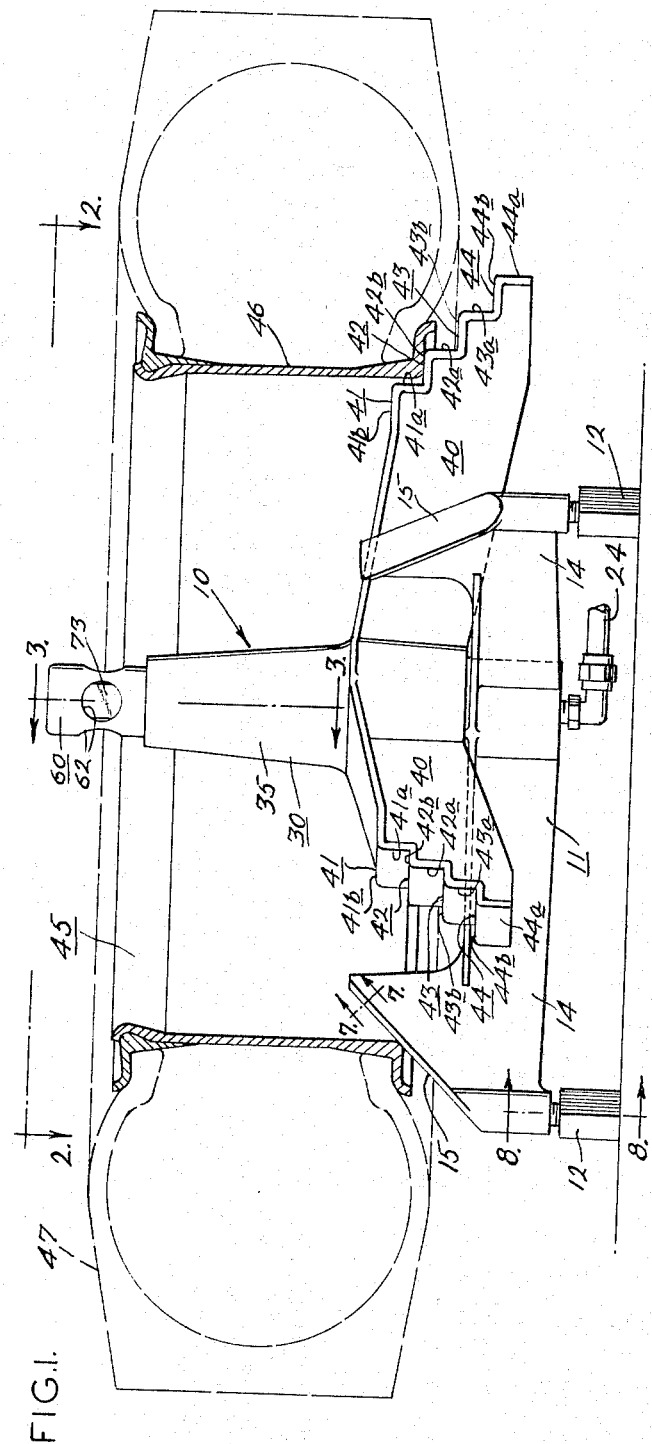
FIG.1.
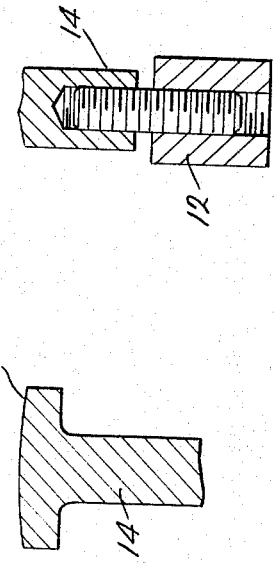
FIG.7.
FIG.8.
INVENTOR:
DON J. MARSHALL
BY
Howson & Howson
ATTYS.

Aug. 15, 1967  D. J. MARSHALL  3,335,611
INDUSTRIAL WHEEL BALANCING DEVICE
Filed April 9, 1965  3 Sheets-Sheet 2
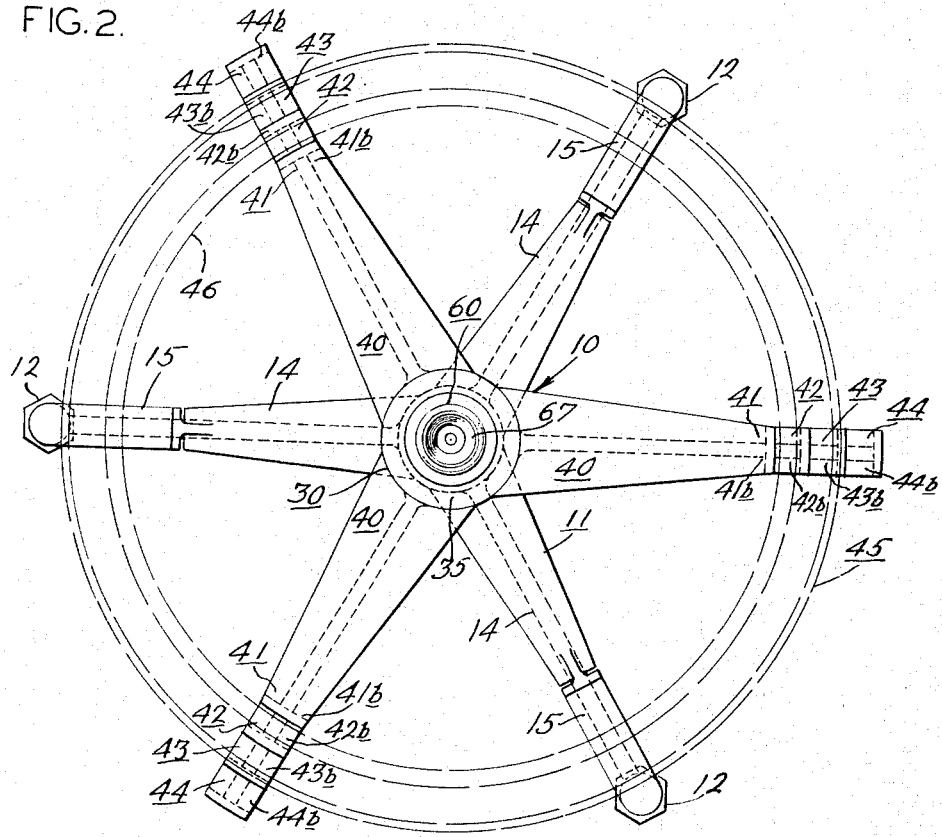
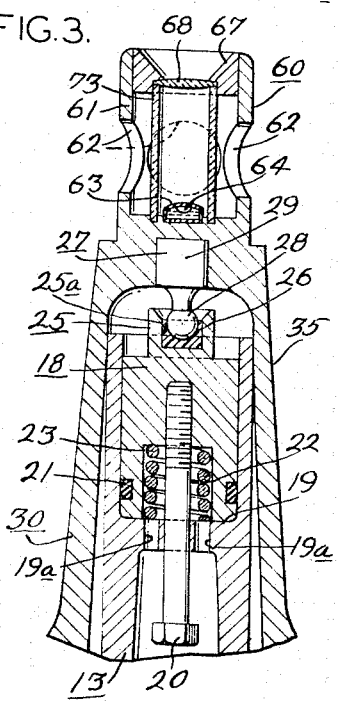
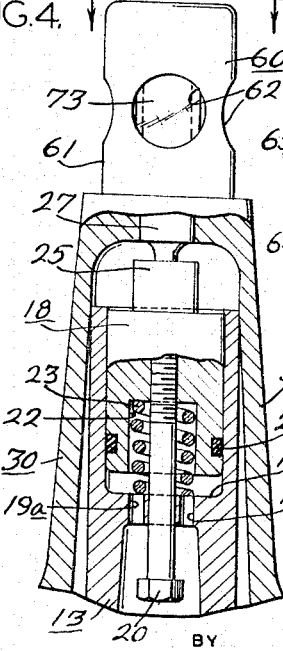
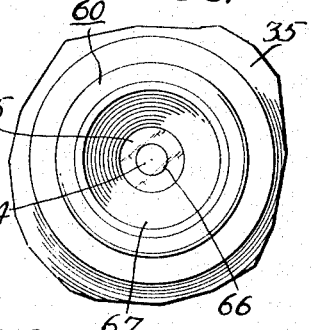
INVENTOR:
DON J. MARSHALL
BY
Howson & Howson
ATTYS.

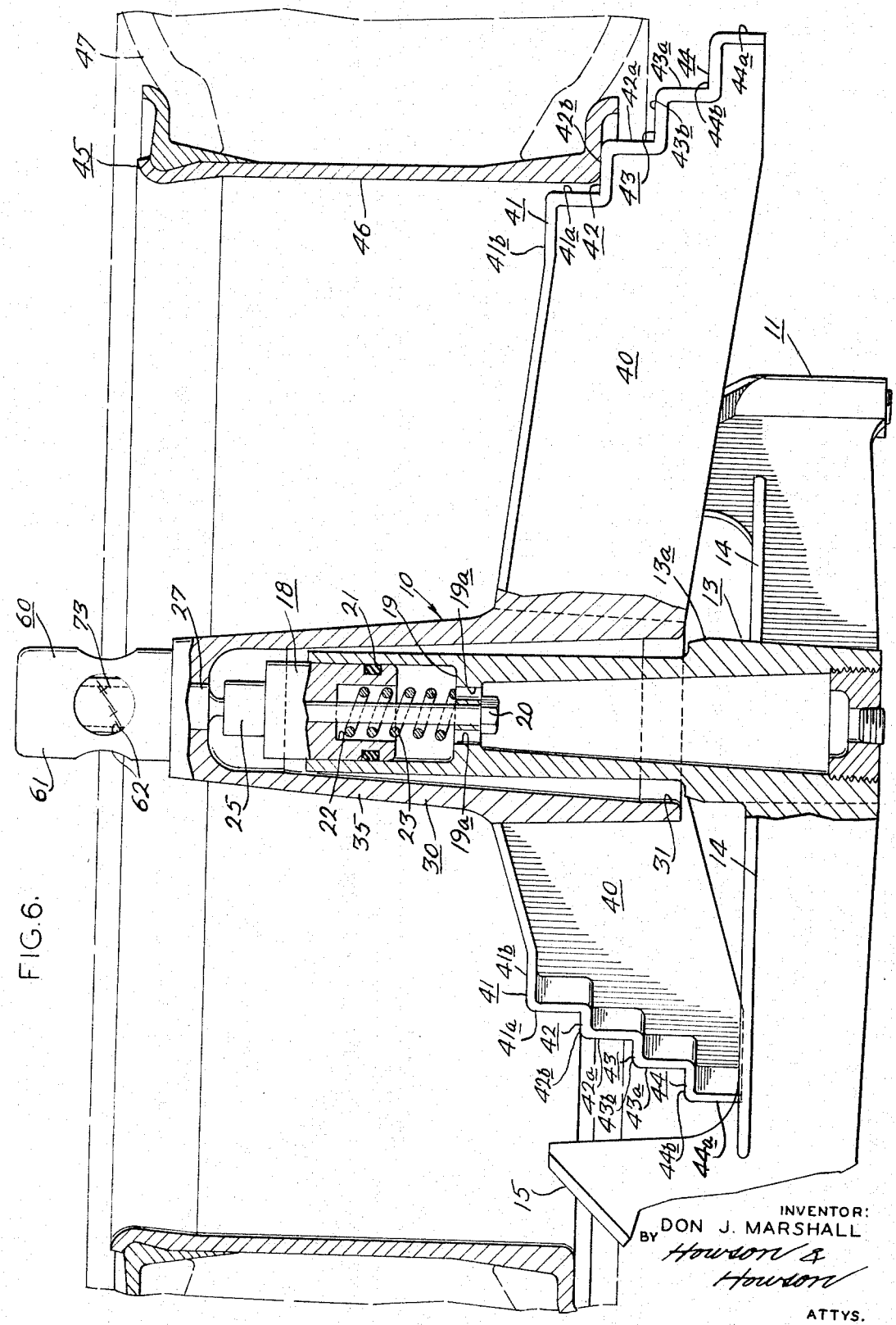

United States Patent Office

3,335,611
Patented Aug. 15, 1967

3,335,611
INDUSTRIAL WHEEL BALANCING DEVICE
Don J. Marshall, Edgewater, Md., assignor to Goodall Semi-Metallic Hose & Mfg. Co., Philadelphia, Pa., a corporation of Pennsylvania
Filed Apr. 9, 1965, Ser. No. 447,031
21 Claims. (Cl. 73—484)

This application is a continuation-in-part of application, S.N. 437,219, filed on Mar. 4, 1965.

The present invention relates to wheel balancing devices, and more particularly to a device for determining the existence and amount of imbalance in the mass of a heavy duty transport tire and the rim upon which it is mounted, with reference to the wheel's center of rotation.

As is well known to those skilled in the art of vehicle maintenance, any mass imbalance about the rotational center of a wheel (including a tire and rim) can create centrifugal forces, at today's highway speeds, sufficient to be destructive to both the tire and the suspension components of the vehicle to which it is attached. Further, heavy road pounding forces developed by such a mass imbalance in heavy transport wheels are blamed, with considerable substantiating evidence, for early failure of some paving materials. As may be imagined, the cumulative loss in premature failure of tires, vehicle suspension components, and highway destruction is, for the most part, incalculable but may be estimated to run well into the hundreds of millions of dollars per year.

As should be understood by those not directly connected with truck maintenance, the problem of wheel mass imbalance has been to a large degree unrecognized in the past, and poorly met by the prior art in the production of practicable and economically priced devices for the detection of such mass imbalance and for correction of the same.

One of the primary reasons for lack of recognition of the problem, as relating to industrial transport or truck tires, is that the spring suspension of heavy transport vehicles are heavy and stiff, and not so easily set in resonant vibration as are their counterparts in passenger automobiles. For this reason, while the passenger car and driver receive early and unmistakable sensory warning of these vibrations, the driver of a heavy transport vehicle receives very little or no warning. Therefore, it is not until severe spot wear is evident on the tires, accompanied with early failure of wheel bearings, kingpins, and the like, that notice of such mass imbalance becomes evident. Further, until comparatively recently, and only then through educational programs of the tire industry has blame been rightly placed.

The prior art has only produced a few devices for the detection of mass imbalance in heavy duty industrial wheels, and the known devices are of the highly expensive "dynamic" type. Thus, except in the instance of the very largest truck fleets with enlightened maintenance programs, our heavy duty transport industry is operating without this vitally needed service.

In view of the above, it is a primary object of the present invention to provide a heavy duty industrial transport wheel balancer at a low cost, of rugged construction, and yet sensitive and accurate for balancing industrial wheels.

Another object of the present invention is to combine new and novel structure with the pivot bearing means and the first and second sighting means of copending patent application S. N. 437,219, filed Mar. 4, 1965, and to adapt these latter devices to the heavy duty transport tire field.

Another object of the present invention is to provide novel centering means to position a heavy duty wheel assembly upon supporting structure whereby the wheel's rotational center will be coaxial with the support member.

Another object of the present invention is to provide means to position a heavy duty wheel whereby its toroidal axis is accurately perpendicular to the vertical axis of the support member.

Still another object of the present invention is to provide means whereby during the mounting of the wheel onto the device all parts of both the mount and the wheel may be rigidly held in proper relationship.

Still another object of the present invention is to provide a heavy duty transport wheel balancer which permits free movement about the rotational axis of the wheel to thereby permit correction of mass imbalance in the wheel.

Still another object of the present invention is to provide a novel structure which will operate substantially at floor level, eliminating the requirement for manual lifting of heavy wheel assemblies, thus contributing to shop safety.

Other objects and a fuller understanding of the invention may be had by referring to the following description and claims taken in conjunction with the accompanying drawings in which:

FIG. 1 is a fragmentary perspective side elevational view of a wheel balancer constructed in accordance with the present invention and having a heavy duty transport wheel mounted thereon;

FIG. 2 is a plan view of the device illustrated in FIG. 1 and taken along line 2—2 thereof with the tire removed for purposes of clarity;

FIG. 3 is an enlarged fragmentary sectional view taken along line 3—3 of FIG. 1;

FIG. 4 is a fragmentary sectional view similar to FIG. 3 but showing the apparatus illustrated therein in a different position;

FIG. 5 is an enlarged fragmentary plan view taken along line 5—5 of FIG. 4;

FIG. 6 is an enlarged fragmentary side elevational view showing the device of the present invention in a position to indicate any mass imbalance about the rotational center of a wheel;

FIG. 7 is an enlarged fragmentary sectional view taken along line 7—7 of FIG. 1; and FIG. 8 is an enlarged fragmentary sectional view taken along line 8—8 of FIG. 1.

Referring now to the drawings, and particularly FIGS. 1 and 6 thereof, an industrial wheel balancing device 10 comprising a centering frame 11 supported on adjustable legs 12 is illustrated therein. The centering frame 11 has an upright, centrally positioned tubular casing 13 mounting a piston 18 in the upper portion thereof and having first bearing means 25 engagable with second bearing means 27 housed in the interior of a tubular casing 35 of a leveling frame 30. As illustrated in FIGS. 1, 2, and 6, the leveling frame 30 has outwardly projecting arms 40 for receiving a rim 46 of a wheel 45 having a peripherally mounted tire 47 thereon. Mounted on the central axis of the leveling frame 30, on the upper portion thereof, is a static tire balancing indicator 60 similar to that disclosed in a copending application, S.N. 437,219, filed Mar. 4, 1965, and utilized to determine errors in the static balance of the wheel 45 mounted on the leveling frame 30.

In accordance with the invention, the centering frame 11 in conjunction with the leveling frame 30 serves to center and level the wheel 45 so that thereafter the leveling frame and wheel may be raised to permit indication of mass imbalance of the wheel 45. To this end, the centering frame 11 has at least three equally circumferentially spaced appendages 14 (see FIG. 2) terminating in inwardly angulated centering slides 15 which are radially disposed an equi-distance from the axis of the centrally positioned tubular casing 13. As illustrated in FIG. 7, the upper surface of the centering slides is preferably arcuate in order that there is minimal contact with the interior of the rim 46. Angularly spaced from the appendages 14, and as illustrated in FIG. 2, are the arms 40 of the leveling frame 30, which arms terminate in axially concentric steps 41–44 having risers 41a–44a and treads 41b–44b. As truck tire rims generally range in interior diameter from 18 through 24 inches, the step 41 is selected with a diameter sufficient to support an 18″ I.D. rim, the step 42 to support a 20″ rim, the step 43 to support a 22″ rim, and the step 44 to support a 24″ rim.

As will be more fully explained hereinafter, the leveling frame 30 is upwardly biased in order that the leveling frame is the first to engage the rim of the wheel. In operation, the rim 46 engages the appropriate step on the arms 40, such as the step 42 illustrated in FIGS. 1 and 6, thus lowering the leveling frame. The slides 15 then engage the inner periphery of the rim centering the tire and rim assembly relative to the central axis of the tubular casing 13. In this connection, it is preferable that the angular position of the slides 15 with respect to the steps be such that the slides intersect the risers and the treads of the steps to thus provide and give the centering effect. For example, as illustrated in the drawings, as the length of the riser of each step is equal to its tread length, the angle of the slides 15 is approximately 45°.

As heretofore set forth, in order that the steps associated with the arms 40 may receive the rim 46 of a wheel 45 prior to engagement of the rim with the slides 15, the leveling frame is biased axially upward prior to its receipt of the wheel 45. To this end, the piston 18 located internally of the tubular casing 13, is provided with a lower stop 19 to limit downward axial movement of the piston, and a limit screw or second stop 20 which serves to limit upward axial movement of the piston 18. As illustrated in FIGS. 3, 4, and 6, in the present instance the stop 19 is integral with the casing 13 and provided with apertures 19a to permit fluid communication between the lower portion of the tubular casing 13 and the bottom of the piston 18. As illustrated, the piston 18 is provided with an annular seal 21 and a recessed portion 22 housing a compression spring 23, the lower end of which engages the stop 19 and which tends to raise the leveling frame 30, when there is no wheel on the leveling frame. This normal upward biasing tendency of the spring 23 permits registry of the rim 46 of the wheel 45 with the step portion associated with the arms 40 of the leveling frame 30 prior to the rim's engagement with the slides 15 of the centering frame 11.

After the wheel 45 has been placed on the leveling frame 30 and centered by the action of the slides 15, means are provided to raise the piston 18, and therefore the leveling frame 30, a sufficient distance to prevent engagement of the interior surface of the rim 46 with the slides 15 and the wheel is then in a position to be balanced. To this end, an air hose coupling 24 provides entry into the interior of the tubular casing 13 and permits air pressure to communicate with the undersurface of the piston 18 via the apertures 19a.

After the leveling frame 30 has been raised by the piston 18 until the limit stop 20 engages the stop 19, both the wheel 45 and the leveling frame 30 are balanced on the bearing means 27 and 25.

As illustrated in FIG. 3, preferably the first bearing means 25 comprises a recessed portion 25a mounting a seat 26 of polymerized fluoro-carbon resin, in the present instance preferably Teflon, to receive a pivot ball 28 of the second bearing means 27. A carrier 29 connects the pivot ball 28 to the central axis of the leveling frame 30. The use of a material such as Teflon as the seat material for the pivot ball 28 permits of cost savings as well as providing a more rigid and rugged overall structure.

As is well known, Teflon is a polytetrafluoroethylene sold by E. I. du Pont Co. Another substitute for Teflon, also of the class of polymerized fluoro-carbon resins is Kel-F, a polytrifluorochloroethylene material sold commerically by M. W. Kellogg Company. For purposes of the present invention, the particular material used may be loaded with, for example, sintered powdered metal matrices or may be unloaded, virgin, polymerized fluorocarbon resins, dependent upon the thicknesses and support for the seat material.

In order to permit rapid indication of mass imbalance about the center of rotation of the wheel 45, a wheel balance indicator 60 is mounted on the tubular casing 35 of the leveling frame 30. As best illustrated in FIG. 3, the wheel balance indicator 60 comprises a tubular casing 61 having circumferentially spaced light admitting apertures 62 and mounted in the lower portion a level vial 63 having a gaseous bubble 64 therein. As illustrated in FIG. 5, the level vial 63 has a clear upper portion 65 having etched thereon an axially concentric target ring 66. In the upper portion of the casing is an eyepiece 67 mounting a magnifying lens 68. Intermediate the vial 63 and the lens 68 is a clear tube 73 which serves to seal the upper surface 65 of the vial, and the lower surface of the lens 71 while permitting light to pass therethrough.

As illustrated in FIG. 5, when the wheel 45 is in balance, the bubble 64 will appear, with the eye guided to proper position by the relative concentric positioning of the circular hairline on the vial, to be exactly in the center of the bull's-eye formed by the concentric visual impression. In this manner, not only is mass imbalance easily detected, but errors due to parallax and/or refraction are avoided.

After the wheel has been balanced, air pressure may be released by disconnecting the air hose and the piston 18 will descend, under the weight of the wheel to the position illustrated in FIG. 3. Thereafter, removal of the wheel from the device will permit the piston 18 to once again assume the position shown in FIG. 4.

In accordance with another feature of the invention, the wheel balance indicator 60 may be utilized to level the wheel balancer by adjusting the adjustable legs 12, prior to commencement of the balancing operation. In this connection, it is desirable that the tubular casing 35 of the leveling frame 30 be axially aligned with the tubular casing 13 of the centering frame 11 when no wheel is mounted on the balancer. To this end, when there is no wheel load, two point engagement is provided between the tubular casing 13 and the tubular casing 35. As best illustrated in FIG. 6, the exterior surface of the lower portion of the tubular casing 13, adjacent the lower end of the tubular casing 35 is provided with an inwardly tapered portion 13a which permits engagement with an interior lower lip 31 of the leveling frame 30. Of course the other point of engagement between the casings 13 and 35 is the connection between the bearing means 25 and 27. By providing two point engagement, the legs 12 may be adjusted until the bubble 64 of the wheel balance indicator 60 is aligned within the circular hairline 66 in the center of the bulls-eye formed by the concentric visual impression.

Thus an industrial wheel balancing stand is provided which easily and accurately measures and detects any eccentricity in the center of mass of heavy industrial wheels relative to the center of rotation of the wheel.

Although the invention has been described with a certain degree of particularity, it is understood that the present disclosure has been made only by way of example and that numerous changes in the details of construction and the combination and arrangement of parts may be made without departing from the spirit and the scope of the invention as hereinafter claimed.

What is claimed is:

1. A heavy duty transport wheel balancer comprising in combination: a centering frame having circumferentially spaced legs, said centering frame having an upright, centrally positioned tubular casing, and at least two inwardly angulated centering slides disposed circumferentially of said tubular casing, said centering slides being radially disposed an equal distance from the axis of said casing; a leveling frame comprising a tubular casing circumscribing said tubular casing of said centering frame and having outwardly projecting arms terminating in means to support and level said wheel; means upwardly biasing said leveling frame relative to said centering frame to permit engagement of a wheel thereon prior to engagement of said wheel with said centering slides; a piston mounted in the upper portion of said centering frame and having upwardly projecting first bearing means engageable with and supporting a downwardly projecting second bearing means associated with said tubular casing of said leveling frame; and means to permit fluid communication with said piston to axially raise and lower said leveling frame relative to said centering frame.

2. A heavy duty transport wheel balancer in accordance with claim 1 wherein said means to support and level said wheel comprises a plurality of axially concentric steps, at least some of said steps having a riser and a tread portion.

3. A heavy duty transport wheel balancer in accordance with claim 2 wherein the angular position of said slides with respect to said steps is such that the plane of the slides intersects the risers and the treads of the steps upon said centering frame moving downwardly under the weight of said wheel against said biasing means.

4. A heavy duty transport wheel balancer in accordance with claim 1 wherein said biasing means is axially positioned in said tubular casing of said centering frame, underlying and in engagement with said piston.

5. A heavy duty transport wheel balancer in accordance with claim 4 wherein said piston has a first stop means mounted interiorly of said tubular casing of said centering frame to limit downward axial movement of said piston, and a second stop means to limit upward axial movement of said piston.

6. A heavy duty transport wheel balancer in accordance with claim 1 wherein one of said bearing means comprises a recessed, polymerized flouro-carbon resin seat and the other of said bearing means comprises a ball engaging said recessed seat.

7. A heavy duty transport wheel balancer in accordance with claim 1 wherein said first bearing means comprises a polymerized flouro-carbon resin seat connected to and recessed within a portion of said piston; and wherein said second bearing means comprises a downwardly projecting ball engageable and rotatable in said seat.

8. A heavy duty transport wheel balancer in accordance with claim 1 including a tire balance indicator mounted axially of said leveling frame and superimposed thereon; said indicator comprising an upstanding tubular casing having a level vial at the lower end thereof, and a gaseous bubble in said vial, a lens spaced upwardly from said vial and mounted interiorly of said casing; spaced first and second sighting means in said casing, said sighting means axially alignable whereby in viewing said bubble, said second sighting means is superimposed on said first sighting means to avoid errors in parallax.

9. A heavy duty transport wheel balancer in accordance with claim 8 wherein said first sighting means comprises an etched circular hairline on said vial and said second sighting means comprises the inner periphery of an eyepiece.

10. A heavy duty transport wheel balancer in accordance with claim 1 wherein said legs have means to adjust the relative level of said frame.

11. A heavy duty transport wheel balancer in accordance with claim 1 wherein said tubular casing of said centering frame comprises an exterior radial extension having an inwardly tapered portion, and said tubular casing of said leveling frame has an interior lip portion engageable with said inwardly tapered portion to permit axial alignment of said tubular casing when no wheel has been placed upon said rim.

12. A heavy duty transport wheel balancer comprising in combination: a centering frame having at least three, equally circumferentially spaced legs, said centering frame having an upright, centrally positioned tubular casing, and at least three equally spaced, inwardly angulated centering slides disposed circumferentially of said tubular casing, said centering slides being radially disposed an equal distance from the axis of said casing, and positioned to engage the periphery of the inner rim of an industrial transport wheel; a leveling frame comprising a tubular casing circumscribing said tubular casing of said centering frame and having outwardly projecting arms terminating in means to support and level said rim of said wheel; means upwardly biasing said leveling frame relative to said centering frame to permit engagement of a wheel thereon prior to engagement of said wheel with said centering slides, a piston mounted in the upper portion of said centering frame and having upwardly projecting first bearing means engageable with and supporting a downwardly projecting second bearing means associated with said tubular casing of said leveling frame; said piston having a first stop to limit downward axial movement of said piston and a second stop to limit upward axial movement of said piston; and means to permit fluid communication with said piston to axially raise and lower said leveling frame relative to said centering frame.

13. A heavy duty transport wheel balancer in accordance with claim 12 wherein said means to support and level said wheel comprises a plurality of axially concentric steps, at least some of said steps having a riser and a tread portion.

14. A heavy duty transport wheel balancer in accordance with claim 13 wherein the angular position of said slides with respect to said steps is such that the plane of the slides intersects the risers and the treads of the steps upon said centering frame moving downwardly under the weight of said wheel against said biasing means.

15. A heavy duty transport wheel balancer in accordance with claim 12 wherein said biasing means is axially positioned in said tubular casing of said centering frame interposed between said first stop means and said piston and engageable therewith.

16. A heavy duty transport wheel balancer in accordance with claim 12 wherein one of said bearing means comprises a recessed, polymerized fluoro-carbon resin seat and the other of said bearing means comprises a ball engaging said recessed seat.

17. A heavy duty transport wheel balancer in accordance with claim 12 wherein said first bearing means comprises a polymerized fluoro-carbon resin seat connected to and recessed within a portion of said piston; and wherein said second bearing means comprises a downwardly projecting ball engageable and rotatable in said seat.

18. A heavy duty transport wheel balancer in accordance with claim 12 including a tire balance indicator mounted axially of said leveling frame and superimposed thereon; said indicator comprising an upstanding tubular casing having a level vial at the lower end thereof, and a gaseous bubble in said vial, a lens spaced upwardly from said vial and mounted interiorly of said casing; spaced first and second sighting means in said casing, said sighting means axially alignable whereby in viewing said bubble, said second sighting means is superimposed on said first sighting means to avoid errors in parallax.

19. A heavy duty transport wheel balancer in accordance with claim 18 wherein said first sighting means comprises an etched circular hairline on said vial and said second sighting means comprises the inner periphery of an eyepiece.

20. A heavy duty transport wheel balancer in accordance with claim 12 wherein said legs have means to adjust the relative level of said frame.

21. A heavy duty transport wheel balancer in accordance with claim 12 wherein said tubular casing of said centering frame comprises an exterior radial extension having an inwardly tapered portion, and said tubular casing of said leveling frame has an interior lip portion engageable with said inwardly tapered portion to permit axial alignment of said tubular casing when no wheel has been placed upon said rim.

References Cited
UNITED STATES PATENTS

| | | | |
|---|---|---|---|
| 2,565,732 | 8/1951 | Koertge et al. | 73—484 |
| 2,589,456 | 3/1952 | Tinkham | 73—483 |
| 2,679,751 | 6/1954 | Pfeiffer | 73—484 |

RICHARD C. QUEISSER, Primary Examiner.

J. J. GILL, Assistant Examiner.